US010659322B2

(12) United States Patent
Ishizaka

(10) Patent No.: US 10,659,322 B2
(45) Date of Patent: May 19, 2020

(54) MONITORING SYSTEM, FACILITY MANAGEMENT DEVICE, MONITORING METHOD, AND PROGRAM

(71) Applicant: Mitsubishi Electric Corporation, Tokyo (JP)

(72) Inventor: Taichi Ishizaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 872 days.

(21) Appl. No.: 14/786,614

(22) PCT Filed: May 22, 2013

(86) PCT No.: PCT/JP2013/064177
§ 371 (c)(1),
(2) Date: Oct. 23, 2015

(87) PCT Pub. No.: WO2014/188530
PCT Pub. Date: Nov. 27, 2014

(65) Prior Publication Data
US 2016/0080219 A1 Mar. 17, 2016

(51) Int. Cl.
*H04L 12/26* (2006.01)
*H04L 29/08* (2006.01)
*H04Q 9/00* (2006.01)

(52) U.S. Cl.
CPC .............. *H04L 43/04* (2013.01); *H04L 67/02* (2013.01); *H04Q 9/00* (2013.01); *H04L 43/045* (2013.01); *H04L 67/36* (2013.01)

(58) Field of Classification Search
CPC ............ H04L 43/04; H04L 67/02; H04Q 9/00
See application file for complete search history.

(56) References Cited

U.S. PATENT DOCUMENTS

| 8,190,773 B2 * | 5/2012 | Wikman | H04L 29/12066 |
| | | | 709/245 |
| 2002/0002627 A1 * | 1/2002 | Stead | H04L 29/06 |
| | | | 709/250 |

(Continued)

FOREIGN PATENT DOCUMENTS

| JP | 2005-073415 A | 3/2005 |
| JP | 2006-127039 A | 5/2006 |

(Continued)

OTHER PUBLICATIONS

International Search Report of the International Searching Authority dated Aug. 13, 2013 for the corresponding international application No. PCT/JP2013/064177 (and English translation).

(Continued)

*Primary Examiner* — Patrice L Winder
*Assistant Examiner* — Aye M Aung
(74) *Attorney, Agent, or Firm* — Posz Law Group, PLC

(57) ABSTRACT

A monitoring system comprises an equipment management device, a relay server, and monitoring terminals. The equipment management device is configured to establish with the relay server first communication for notifying the monitoring terminals of the states of equipment items. Furthermore, the equipment management device is configured to establish with the relay server second communication, which is different from the first communication, for monitoring equipment information regarding the equipment items from each of the monitoring terminals. The monitoring terminals establish the first communication and second communication with the relay server. The relay server is configured to relay the first communication and second communication.

8 Claims, 14 Drawing Sheets

(56) References Cited

U.S. PATENT DOCUMENTS

| | | | |
|---|---|---|---|
| 2002/0180579 A1* | 12/2002 | Nagaoka | H04L 12/2803 340/3.1 |
| 2005/0015584 A1* | 1/2005 | Takechi | H04L 29/12009 713/151 |
| 2005/0185595 A1* | 8/2005 | Lee | H04L 12/2803 370/252 |
| 2008/0028432 A1* | 1/2008 | Hong | H04L 12/2801 725/111 |
| 2009/0057428 A1 | 3/2009 | Geadelmann et al. | |
| 2009/0232152 A1* | 9/2009 | Chen | H04L 12/42 370/419 |
| 2010/0156632 A1* | 6/2010 | Hyland | G08B 25/009 340/540 |
| 2011/0106279 A1* | 5/2011 | Cho | G08C 17/02 700/90 |
| 2011/0161212 A1* | 6/2011 | Bozionek | G06Q 30/02 705/30 |
| 2012/0130513 A1* | 5/2012 | Hao | G05B 15/02 700/90 |
| 2012/0287020 A1 | 11/2012 | Utsuki et al. | |
| 2012/0290951 A1 | 11/2012 | Utsuki et al. | |
| 2013/0090773 A1* | 4/2013 | Park | H04L 12/12 700/286 |
| 2014/0006660 A1* | 1/2014 | Frei | H04L 29/1249 710/104 |
| 2014/0095782 A1* | 4/2014 | Koktan | H04L 45/60 711/108 |
| 2015/0134814 A1* | 5/2015 | Ishizaka | H04L 43/08 709/224 |
| 2015/0156270 A1* | 6/2015 | Teraoka | G06F 13/00 709/219 |

FOREIGN PATENT DOCUMENTS

| | | |
|---|---|---|
| JP | 2007-295112 A | 11/2007 |
| JP | 2008-131074 A | 6/2008 |
| JP | 2012-238218 A | 12/2012 |
| JP | 2012-238220 A | 12/2012 |

OTHER PUBLICATIONS

Office Action dated Feb. 27, 2020 issued in corresponding GB patent application No. 1519255.2.

* cited by examiner

MONITORING SYSTEM, FACILITY MANAGEMENT DEVICE, MONITORING METHOD, AND PROGRAM

CROSS REFERENCE TO RELATED APPLICATION

This application is a U.S. national stage application of PCT/JP2013/064177 filed on May 22, 2013, the contents of which are incorporated herein by reference.

TECHNICAL FIELD

The present disclosure relates to a monitoring system, equipment management device, monitoring method, and program.

BACKGROUND ART

Various kinds of equipment items including air conditioning units and lighting apparatuses are installed in a building such as an office building. Recently, equipment management devices collectively managing such equipment items have emerged. Among such equipment management devices, some devices acquire and notify other devices of the states of the equipment items. Using such an equipment management device, the administrator of the equipment items can monitor the states of the equipment items from, for example, a personal computer (PC) connected via a LAN (local area network) to the equipment management device.

However, the LAN connecting the administrator's PC and the equipment management device is often established as a separate network from the LAN used by tenants of the office building and the like for administrative reasons. Therefore, it is difficult to directly monitor the states of the equipment items from a PC of a tenant.

Furthermore, in some cases, the equipment management device has the energy management function of acquiring the electric energy used by the equipment items on the basis of tenant and calculating and displaying the total energy usage of each tenant. Also in such cases, it is difficult to directly monitor the energy usage from a PC of a tenant. Therefore, the energy management function is not fully utilized.

Then, it is assumed to use, for example, a technique of notifying multiple PCs of information via a server on the Internet (for example, Patent Literature 1). Patent Literature 1 discloses a technique for allowing contents displayed by an information processing device to be shared and displayed by multiple other information processing devices on a real time bases via a server on the Internet. Using this technique, the tenants can monitor the contents distributed by the equipment management device.

CITATION LIST

Patent Literature

Patent Literature 1: Unexamined Japanese Patent Application Kokai Publication No. 2012-238218.

SUMMARY OF INVENTION

Technical Problem

However, it is unlikely that multiple tenants always view the same contents. In many cases, for example, one tenant monitors the states of the equipment items while another tenant views its own energy usage.

Therefore, when the technique described in the Patent Literature 1 is used, it is necessary to distribute to each tenant all distributable data including the states of the equipment items and the energy usage. However, distributing all distributable data increases the communication volume of unnecessary data and the communication bands may be wasted.

The present disclosure is made with the view of the above situation and an objective of the present disclosure is to reduce the communication volume in monitoring the states of equipment items and the like.

Solution to Problem

In order to achieve the above objective, the monitoring system of the present disclosure comprises an equipment management device connected to a network and configured to manage equipment items installed in a building, a server connected to the network, and a plurality of terminals connected to the network. The equipment management device comprises notification means for establishing with the server first communication for notifying the plurality of terminals of the states of the equipment items, and acquiring from the equipment items and notifying the server through the first communication of the states of the equipment items, and transmission means for establishing with the server second communication, which is different from the first communication, for monitoring equipment information regarding the equipment items from each of the terminals, and receiving a request for the equipment information from the server and transmitting the equipment information to the server in response to the received request through the second communication. The terminals each comprise acquisition means for establishing the first communication with the server and acquiring the states of the equipment items from the server through the first communication, reception means for establishing the second communication with the server, and transmitting a request for the equipment information to the server and receiving the equipment information from the server through the second communication, and presentation means for presenting to the user the states of the equipment items acquired by the acquisition means and the equipment information received by the reception means. The server comprises first relay means for relaying the first communication between the equipment management device and the plurality of terminals and second relay means for relaying the second communication between the equipment management device and each of the terminals.

Advantageous Effects of Invention

According to the present disclosure, the states of equipment items are notified via the first communication and information regarding the equipment items is sent upon request via the second communication different from the first communication. As a result, it is possible to efficiently distribute necessary data and thus reduce the communication volume in monitoring the states of equipment items.

DESCRIPTION OF EMBODIMENTS

Embodiments of the present disclosure will be described in detail hereafter with reference to the drawings.

Embodiment 1

Figure 1:
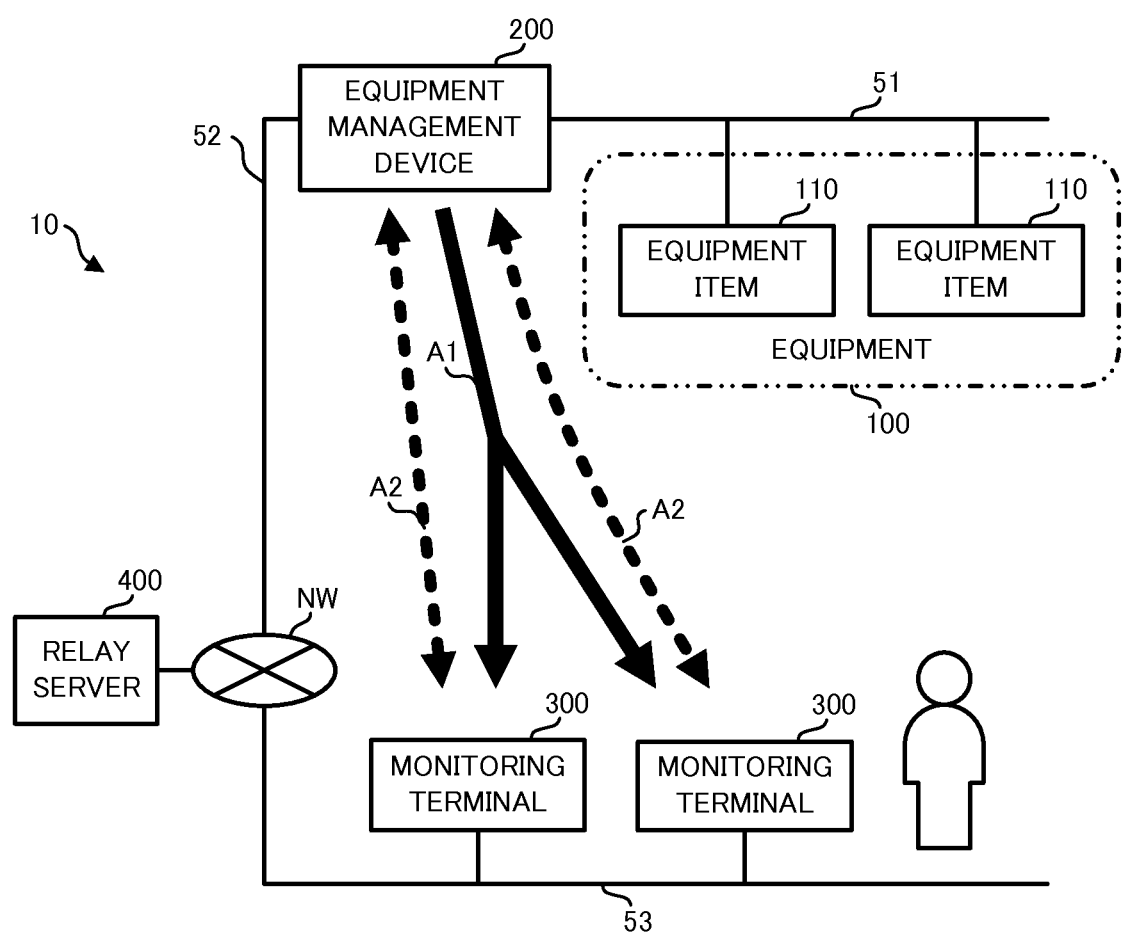
FIG. 1 is a block diagram showing the configuration of the monitoring system according to Embodiment 1.

FIG. 1 shows the configuration of a monitoring system 10 according to this embodiment. The monitoring system 10 is a system for monitoring through a server on a network NW various kinds of information regarding, for example, multiple equipment items 110 installed in an office building. As shown in FIG. 1, the monitoring system 10 has equipment 100 comprising multiple equipment items 110, an equipment management device 200 managing the equipment items 110, multiple monitoring terminals 300 for monitoring information regarding the equipment items 110, and a relay server 400 relaying communication between the equipment management device 200 and monitoring terminals 300.

The equipment items 110 and equipment management device 200 are mutually communicably connected via a dedicated communication line 51 laid in the office building. Furthermore, the equipment management device 200 is connected to the network NW by a communication line 52 such as an optical fiber so that the equipment management device 200 and relay server 400 are mutually communicably connected via the network NW. Furthermore, the monitoring terminals 300 are connected to the network NW by a communication line 53 constituting a LAN so that the monitoring terminals 300 and relay server 400 are mutually communicably connected via the network NW.

The network NW is, for example, the Internet.

The equipment 100 comprises, for example, multiple equipment items 110 installed on a floor of the office building.

The equipment items 110 are each, for example, an air conditioning unit, lighting apparatus, or water heater installed at a given location in the office building. The equipment items 110 each operate according to instructions from the equipment management device 200. The instructions from the equipment management device 200 include requests for the states of the equipment items 110 and commands for controlling the equipment items 110. When a request for the states is made by the equipment management device 200, the equipment items 110 notify the equipment management device 200 of their current states via the communication line 51 in response to the request.

The state of an equipment item 110 includes the operation state of the equipment item 110 such as normal, paused, or abnormal, the values of parameters set for the equipment item 110, and the detected values of sensors constituting the equipment item 110. The abnormal state includes, for example, some errors that occur in the computation, control, or signal processing of the equipment item 110 and detection of damaged or worn members. Furthermore, the sensors are sensors that can detect the power consumption, consumed energy, and quantity of fuel in use.

When an equipment item 110 is an air conditioning unit, the state of the equipment item 110 includes the operation mode such as air conditioning or heating, set target temperature, and room temperature detected by the temperature sensor.

Figure 2:
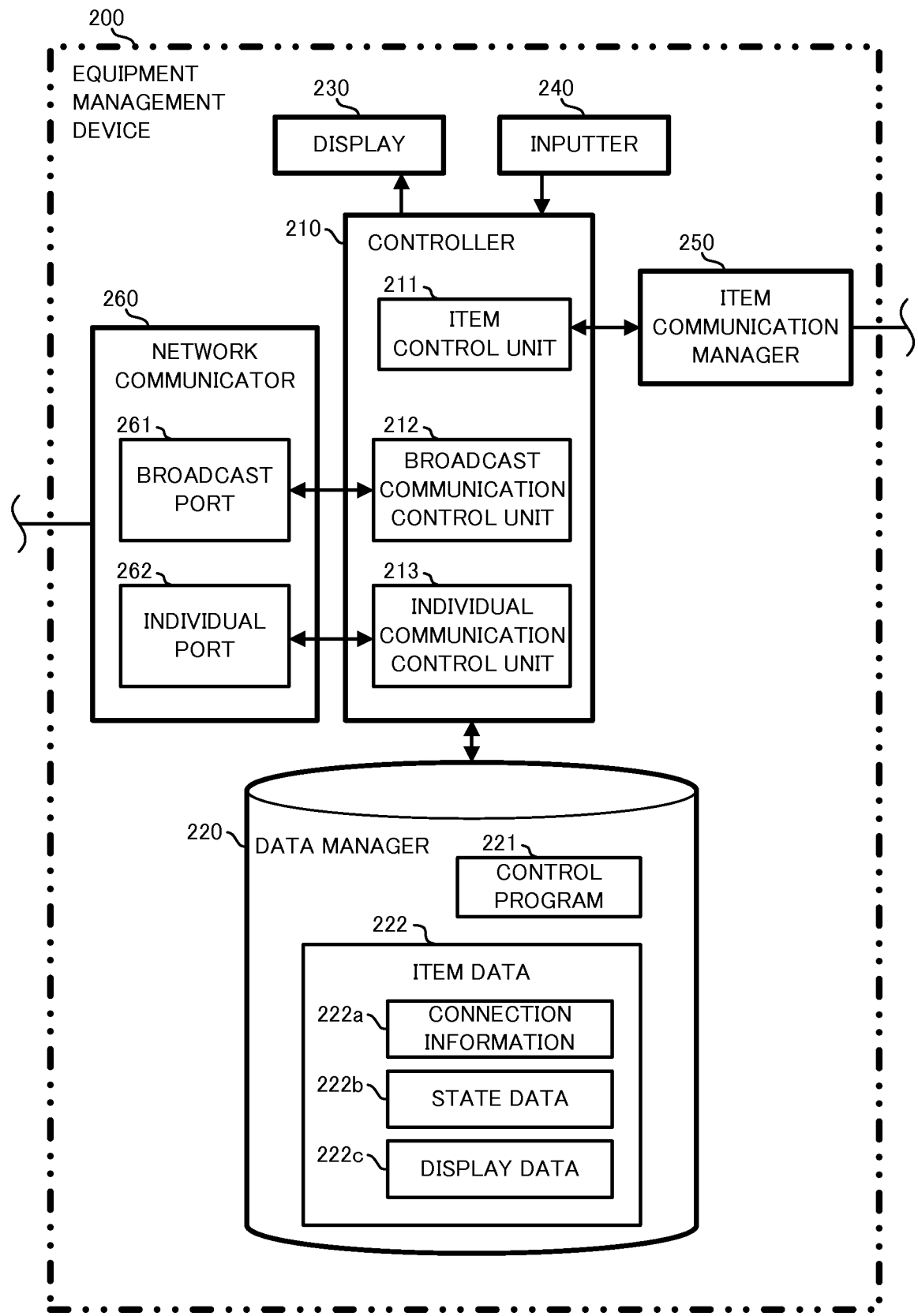
FIG. 2 is a block diagram showing the configuration of the equipment management device.

The equipment management device 200 monitors the state of each equipment item 110 and controls each equipment item 110 so as to collectively manage the equipment items 110 constituting the equipment 100. The equipment management device 200 has, as shown in FIG. 2, a controller 210 controlling the components of the equipment management device 200, a data manager 220 storing and managing data, a display 230 displaying information to the user of the equipment management device 200, an inputter 240 acquiring information entered by the user, an item communication manager 250 for communicating with the equipment items 110, and a network communicator 260 for communicating with the relay server 400.

The controller 210 comprises a CPU (central processing unit), a RAM (random access memory), and the like. The controller 210 executes a control program 221 stored in the data manager 220 to execute the procedure described later. The controller 210 functionally has an item control unit 211 controlling the equipment items 110, and a broadcast communication control unit 212 and individual communication control unit 213 controlling communication with the relay server 400.

The item control unit 211 monitors the states of the equipment items 110 and controls the equipment items 110. For example, the item control unit 211 acquires the states of the equipment items 110 at given time intervals (for example, 30 seconds) and stores the latest states of the equipment items 110 in the data manager 220.

Furthermore, acquiring details of an operation on the equipment items 110, the item control unit 211 controls the equipment items 110 according to the operation details. The operation on the equipment items 110 includes, for example, requests for notification of the states of the equipment items 110 and change of the states of the equipment items 110.

The broadcast communication control unit 212 notifies the relay server 400 of the latest states of the equipment items 110 when there is any change in the states of the equipment items 110.

Receiving a request for information regarding an equipment item 110 from the relay server 400, the individual communication control unit 213 outputs information regarding the equipment item 110 to the relay server 400 in response to the received request. For example, when the individual communication control unit 213 acquires details of an operation on an equipment item 110 from the relay server 400, the individual communication control unit 213 outputs the operation details to the item control unit 211. Then, the individual communication control unit 213 outputs the state of the equipment item 110 having started operation in accordance with the operation details as information regarding the equipment item 110.

Furthermore, receiving an instruction to create new information regarding an equipment item 110, the individual communication control unit 213 creates and sends information regarding the equipment item 110 according to the instruction. The information created by the individual communication control unit 213 is, for example, statistic data or time-series data of the energy used by the equipment item 110 or the like.

The data manager 220 is configured to include a nonvolatile memory such as a hard disk or flash memory. The data manager 220 stores various data including item data 222 in addition to the control program 221. Then, the data manager 220 supplies the controller 210 with data used by the controller 210 and stores data supplied from the controller 210.

The item data 222 include connection information 222a regarding the equipment items 110, state data 222b presenting the states of the equipment items 110, and display data 222c presenting information displayed on a monitoring screen. Here, the monitoring screen is a screen for monitoring the states of the equipment items 110 and the like. The monitoring screen is displayed by the monitoring terminals 300.

The connection information 222a is information for connecting to the equipment items 110 constituting the equipment 100 and acquiring the states of the equipment items 110. The connection information 222a includes, for example, numbers presenting the addresses for identifying the equipment items 110 connected to the equipment management device 200 and model information presenting the models of the equipment items 110.

Updated by the item control unit 211, the state data 222b present the latest states of the equipment items 110.

The display data 222c include the number of a floor on which the equipment items 110 are installed, a plan view of the floor, a plan view of each equipment item 110, and X and Y coordinates presenting the locations of the equipment items 110 on the floor. The display data 222c are used to position on the monitoring screen a plan view of the floor and icons presenting the equipment items 110.

The display 230 comprises an LCD (liquid crystal display) or the like. The display 230 displays various characters and graphics according to instructions of the controller 210. For example, the display 230 displays a screen for managing the equipment items 110 to the user of the equipment management device 200.

The inputter 240 is configured to include a keyboard and a pointing device such as a mouse and touch pad. In this embodiment, the touch pad of the inputter 240 is integrally formed with the LCD of the display 230 to constitute a touch screen. The inputter 240 acquires and notifies the controller 210 of information entered by the user. The inputter 240 is used to switch the screen displayed by the display 230 and enter operations on the equipment items 110.

The item communication manager 250 comprises a communication interface for communication via the communication line 51 or the like. The item communication manager 250 transfers data received from the equipment items 110 to the controller 210 and sends data output from the controller 210 to the equipment items 110.

The network communicator 260 comprises a communication interface for communication via the communication line 52 or the like. The network communicator 260 transfers data received from the relay server 400 to the controller 210 and sends data output from the controller 210 to the relay server 400.

The network communicator 260 has a broadcast port 261 for nearly simultaneously notifying multiple monitoring terminals 300 of the states of the equipment items 110 and an individual port 262 for communicating individually with each of the monitoring terminals 300.

In FIG. 1, the communication via the broadcast port 261 is presented by a thick solid-line arrow A1. Furthermore, the communication via the individual port 262 is presented by thick broken-line arrows A2.

The broadcast port 261 and individual port 262 according to this embodiment are both given ports by a TCP (transmission control protocol) and, for example, ports for communication in compliance with the WebSocket protocol.

Figure 3:
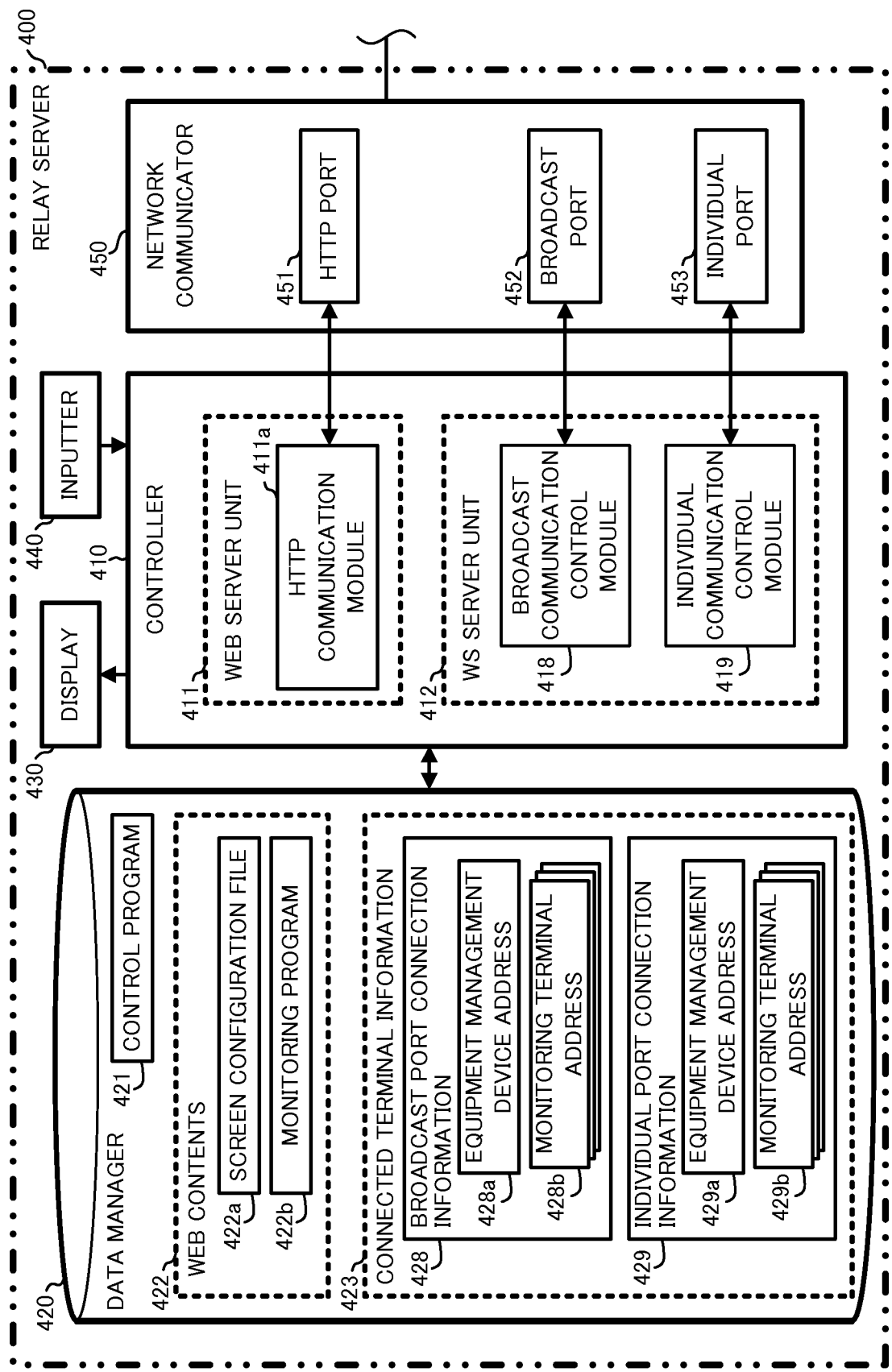
FIG. 3 is a block diagram showing the configuration of the relay server.

The relay server 400 will be described hereafter. The relay server 400 is a computer connected to the network NW. The relay server 400 has, as shown in FIG. 3, a controller 410 controlling the components of the relay server 400, a data manager 420 storing and managing data, a display 430 displaying information to the administrator of the relay server 400, an inputter 440 acquiring information entered by the administrator, and a network communicator 450 for communication via the network NW.

The controller 410 comprises a CPU, a RAM, and the like. The controller 410 executes a control program 421 stored in the data manager 420 to execute the procedure described later. The controller 410 has a Web server unit 411 functioning as a Web server and a WebSocket server unit 412 functioning as a server communicating in compliance with the WebSocket (the WS server unit 412 hereafter).

The Web server unit 411 distributes Web contents 422 stored in the data manager 420 to the monitoring terminals 300. The Web server unit 411 has an HTTP communication module 411a sending the Web contents in response to requests from the monitoring terminals 300.

The WS server unit 412 relays communication between the equipment management device 200 and monitoring terminals 300. The WS server unit 412 has a broadcast communication control module 418 controlling communication via the broadcast port 452 of the network communicator 450 and an individual communication control module 419 controlling communication via the individual port 453 of the network communicator 450.

The broadcast communication control module 418 puts the broadcast port 452 in a connectable state (open). Then, the broadcast communication control module 418 relays communication between the equipment management device 200 and monitoring terminals 300 connected to the broadcast port 452 as indicated by the arrow A1 in FIG. 1.

The individual communication control module 419 puts the individual port 453 in a connectable state (open). Then, the individual communication control module 419 relays communication between the equipment management device 200 and monitoring terminals 300 connected to the individual port 453 as indicated by the arrows A2 in FIG. 1. In other words, the individual communication control module 419 forwards data sent from the equipment management device 200 to any of the monitoring terminals 300 and forwards data sent from any of the monitoring terminals 300 to the equipment management device 200.

The data manager 420 is configured to include a nonvolatile memory such as a hard disk or flash memory. The data manager 420 stores and manages various data in addition to the control program 421. Then, the data manager 420 supplies the controller 410 with data used by the controller 410 and stores data supplied from the controller 410. The data stored by the data manager 420 include the Web contents 422 distributed by the Web server unit 411 to the monitoring terminals 300 and connected terminal information 423 presenting the terminals of which the connection to the relay server 400 is established.

The Web contents 422 are data for drawing monitoring screens. The Web contents 422 have a screen configuration file 422a described in the HTML (hypertext markup language) and a monitoring program 422b described in JavaScript (registered trademark).

The connected terminal information 423 comprises identification information for identifying the equipment management device 200 and monitoring terminals 300. The identification information is, for example, the IP address (Internet protocol address). The connected terminal information 423 includes broadcast port connection information 428 presenting the terminals of which the connection via the broadcast port 452 is established and individual port connection information 429 presenting the terminals of which the connection via the individual port 453 is established.

The broadcast port connection information 428 includes an equipment management device address 428a presenting the IP address of the equipment management device 200 and monitoring terminal addresses 428b presenting the IP addresses of the monitoring terminals 300. On the other hand, the individual port connection information 429 includes an equipment management device address 429a presenting the IP address of the equipment management device 200 and monitoring terminal addresses 429b presenting the IP addresses of the monitoring terminals 300.

The display 430 comprises an LCD or the like. The display 430 displays various graphics and characters according to instructions of the controller 410. For example, the display 430 displays an editing screen for saving the Web contents 422 in the data manager 420 to the administrator of the relay server 400.

The inputter 440 is configured to include a keyboard and a pointing device such as a mouse and touch pad. In this embodiment, the touch pad of the inputter 440 is integrally formed with the LCD of the display 430 to constitute a touch screen. The inputter 440 acquires and notifies the controller 410 of information entered by the administrator of the relay server 400. The inputter 440 is used by the administrator of the relay server 400 to save the Web contents 422 in the data manager 420 and edit the Web contents 422.

The network communicator 450 comprises a communication interface for communication via the network NW or the like. The network communicator 450 transfers to the controller 410 data received from the equipment management device 200 and monitoring terminals 300 via the network NW and sends data output from the controller 410 to the equipment management device 200 and monitoring terminals 300.

The network communicator 450 has an HTTP port 451 for communication in compliance with an HTTP and a broadcast port 452 and individual port 453 for communication in compliance with the WebSocket protocol. The broadcast port 452 is connected to the broadcast port 261 of the equipment management device 200. The individual port 453 is connected to the individual port 262 of the equipment management device 200.

The monitoring terminals 300 will be described hereafter. The monitoring terminals 300 are each a terminal not connected to the communication line 51 such as a portable terminal represented by a smart phone and tablet-type computer, or a PC of a tenant in the office building.

Figure 4:
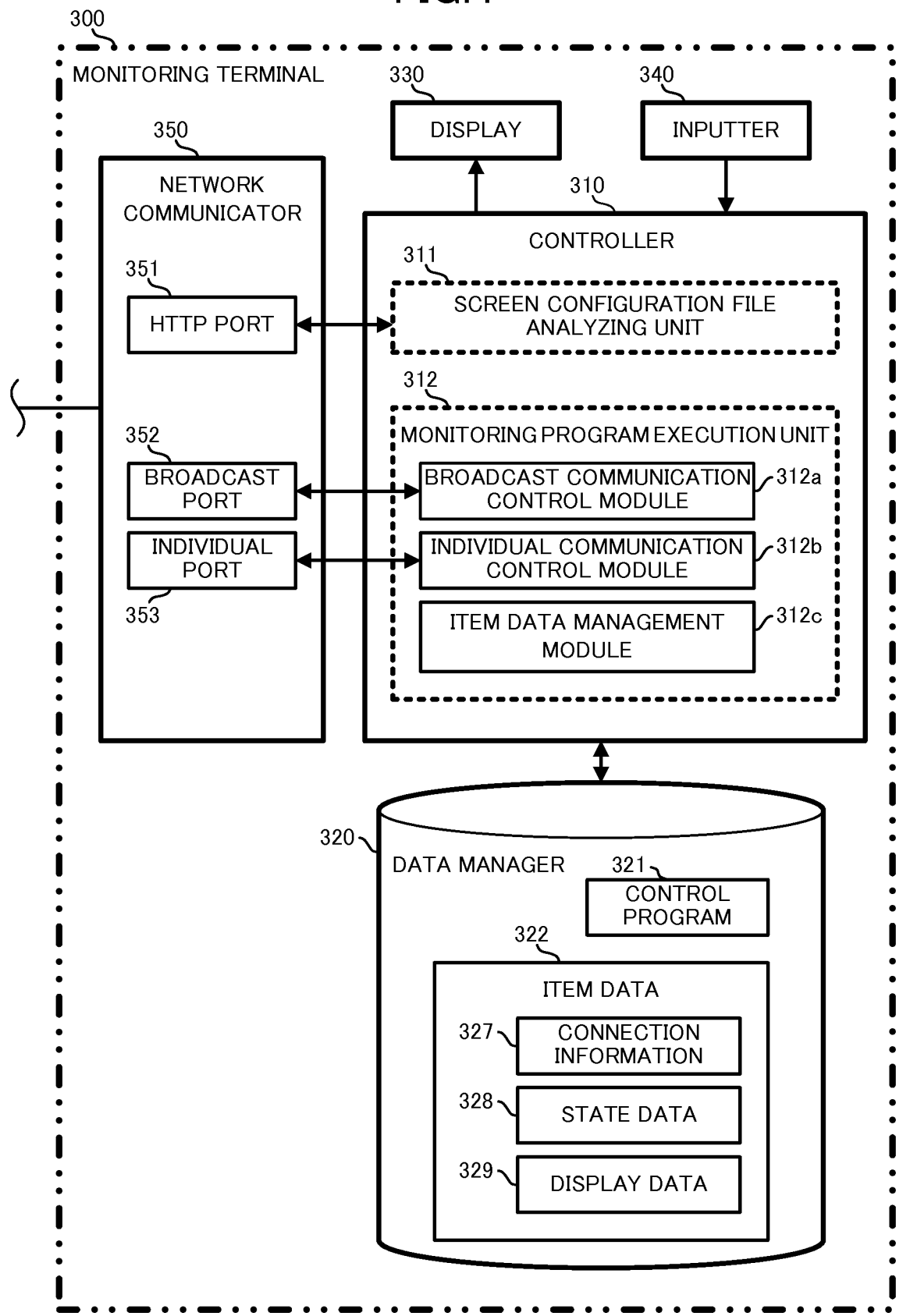
FIG. 4 is a block diagram showing the configuration of the monitoring terminal.

The monitoring terminals 300 each have, as shown in FIG. 4, a controller 310 controlling the components of the monitoring terminal 300, a data manager 320 storing and managing data, a display 330 displaying information to the user of the monitoring terminal 300, an inputter 340 acquiring information entered by the user, and a network communicator 350 for communicating with the relay server 400.

The controller 310 comprises a CPU, a RAM, and the like. The controller 310 executes a control program 321 stored in the data manager 320 to execute the procedure described later. Furthermore, the controller 310 runs a general-purpose Web browser when necessary. This web browser acquires the Web contents 422 from the relay server 400 and displays a monitoring screen to the user.

The controller 310 functionally has a screen configuration file analyzing unit 311 analyzing the screen configuration file 422a and a monitoring program execution unit 312 executing the monitoring program 422b.

The screen configuration file analyzing unit 311 displays the Web browser including a monitoring screen. Furthermore, the monitoring program execution unit 312 executes the monitoring program 422b to execute various procedures. As the monitoring program 422b is executed, the states of the equipment items 110 and various other kinds of information regarding the equipment items 110 are displayed on the monitoring screen.

The monitoring program execution unit 312 functionally has a broadcast communication control module 312a controlling communication via the broadcast port 352 of the network communicator 350, an individual communication control module 312b controlling communication via the individual port 353 of the network communicator 350, and an item data management module 312c managing the item data 322 stored in the data manager 320.

The broadcast communication control module 312a acquires and stores in the data manager 320 the latest states of the equipment items 110 sent from the relay server 400. Furthermore, the broadcast communication control module 312a displays the latest states of the equipment items 110 on the monitoring screen.

The individual communication control module 312b sends to the relay server 400 a command for requesting information regarding the equipment items 110 and receives the information regarding the equipment items 110. For example, the individual communication control module 312b acquires the item data 222 stored in the equipment management device 200 via the relay server 400. Furthermore, the individual communication control module 312b sends to the relay server 400 details of operations on the equipment item 110 and receives operation results.

The item data management module 312c updates the item data 322 stored in the data manager 320 based on the item data 222 received by the individual communication control module 312b. Then, the item data management module 312c updates the monitoring screen based on the updated item data 322.

The data manager 320 is configured to include a nonvolatile memory such as a hard disk or flash memory. The data manager 320 stores various data including the item data 322 in addition to the control program 321. Then, the data manager 320 supplies the controller 310 with data used by the controller 310 and stores data supplied from the controller 310.

The item data 322 are data regarding the equipment items 110 and equivalent to the item data 222 stored in the equipment management device 200. The item data 322 have connection information 322a equivalent to the connection information 222a, state data 322b equivalent to the state data 222b, and display data 322c equivalent to the display data 222c. Updated by the item data management module 312c, the connection data 322a, state data 322b, and display data 322c all present the latest information.

The display 330 comprises an LCD or the like. The display 330 displays various graphics and characters according to instructions of the controller 310. For example, the display 330 displays a Web browser including a monitoring screen to the user of the monitoring terminal 300.

The inputter 340 is configured to include a keyboard and a pointing device such as a mouse and touch pad. In this embodiment, the touch pad of the inputter 340 is integrally formed with the LCD of the display 330 to constitute a touch screen. The inputter 340 acquires and notifies the controller 310 of information entered by the user. The inputter 340 is used to switch the screen displayed by the display 330 and enter operations on the equipment items 110.

The network communicator 350 comprises a communication interface for communication via the network NW or the like. The network communicator 350 transfers data received from the relay server 400 via the network NW to the controller 310 and sends data output from the controller 310 to the relay server 400.

The network communicator 350 has an HTTP port 351 for communication in compliance with an HTTP and a broadcast port 352 and individual port 353 for communication in compliance with the WebSocket protocol. The HTTP port 351 is connected to the HTTP port 451 of the relay server 400. Furthermore, the broadcast port 352 is connected to the broadcast port 452 and the individual port 353 is connected to the individual port 453.

A series of monitoring procedure executed by the monitoring system 10 will be described hereafter using FIGS. 5 to 9. The monitoring procedure shown in FIG. 5 starts as the control programs 221, 321, and 421 are executed by the controllers 210, 310, and 410. Here, for convenience of explanation, the processing is executed in the order shown in FIG. 5. However, some portions of the monitoring procedure can be executed by the controllers 210, 310, and 410 in parallel or in a different order.

Figure 5:
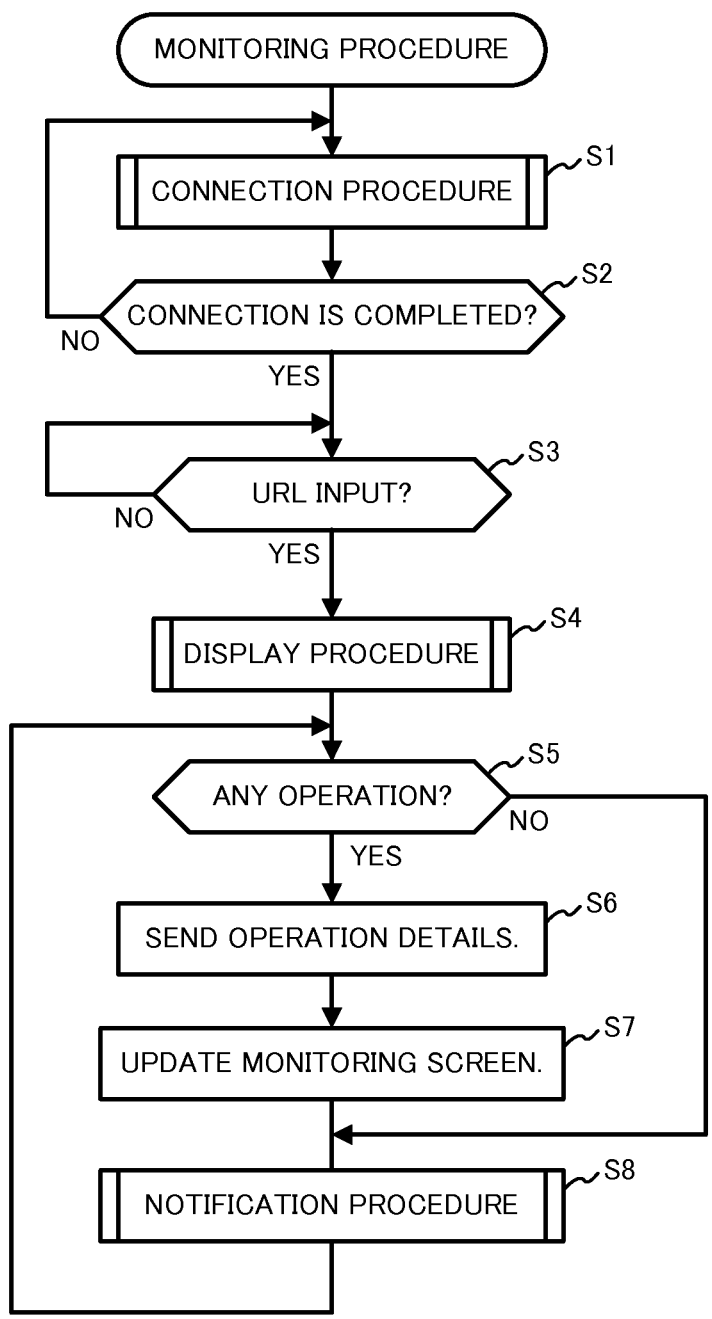
FIG. 5 is a flowchart showing a series of monitoring procedure executed by the monitoring system.

As shown in FIG. 5, the controller 210 of the equipment management device 200 first executes the connection procedure (Step S1). The connection procedure is a procedure to establish communication between the equipment management device 200 and relay server 400. The connection procedure will be described in detail using FIG. 6.

Figure 6:
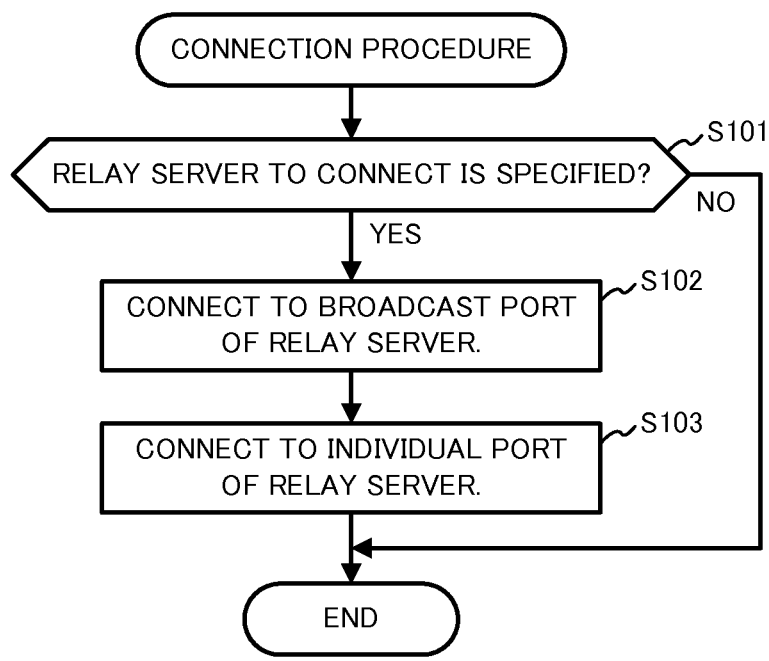
FIG. 6 is a flowchart showing the connection procedure.

As shown in FIG. 6, in the connection procedure, the broadcast communication control unit 212 first determines whether the relay server 400 to connect is specified (Step S101). More specifically, the broadcast communication control unit 212 determines whether the IP address presenting the relay server 400 is stored in the data manager 220.

If the relay server 400 is not specified (Step S101; NO), the broadcast communication control unit 212 ends the connection procedure.

On the other hand, if the relay server 400 is specified (Step S101; YES), the broadcast communication control unit 212 connects to the broadcast port 452 of the relay server 400 (Step S102). More specifically, the broadcast communication control unit 212 establishes connection between the broadcast port 261 and broadcast port 452 to establish communication with the relay server 400 via the broadcast port 261. As a result, the controller 410 updates the equipment management device address 428a stored in the data manager 420.

Then, the broadcast communication control unit 212 connects to the individual port 453 of the relay server 400 (Step S103). More specifically, the broadcast communication control unit 212 establish connection between the individual port 262 and individual port 453 to establish communication with the relay server 400 via the individual port 262. As a result, the controller 410 updates the equipment management device address 429a stored in the data manager 420.

Then, the controller 210 ends the connection procedure.

Returning to FIG. 5, the controller 210 determines whether the connection is completed (Step S2). More specifically, the controller 210 determines whether communication via both the broadcast port 261 and individual port 262 is established. If the connection is not completed (Step S2; NO), the controller 210 repeats the connection procedure.

On the other hand, if the connection is completed (Step S2; YES), the controller 310 of a monitoring terminal 300 determines whether the URL (uniform resource locator) of the relay server 400 is entered in the Web browser by the user of the monitoring terminal 300 (Step S3). If the URL is not entered (Step S3; NO), the controller 310 repeats the processing of the Step S3.

On the other hand, if the URL is entered (Step S3; YES), the display procedure is executed (Step S4). The display procedure is a procedure to establish communication between the monitoring terminal 300 and relay server 400 and display a monitoring screen on the Web browser of the monitoring terminal 300. The display procedure will be described in detail using FIG. 7.

Figure 7:
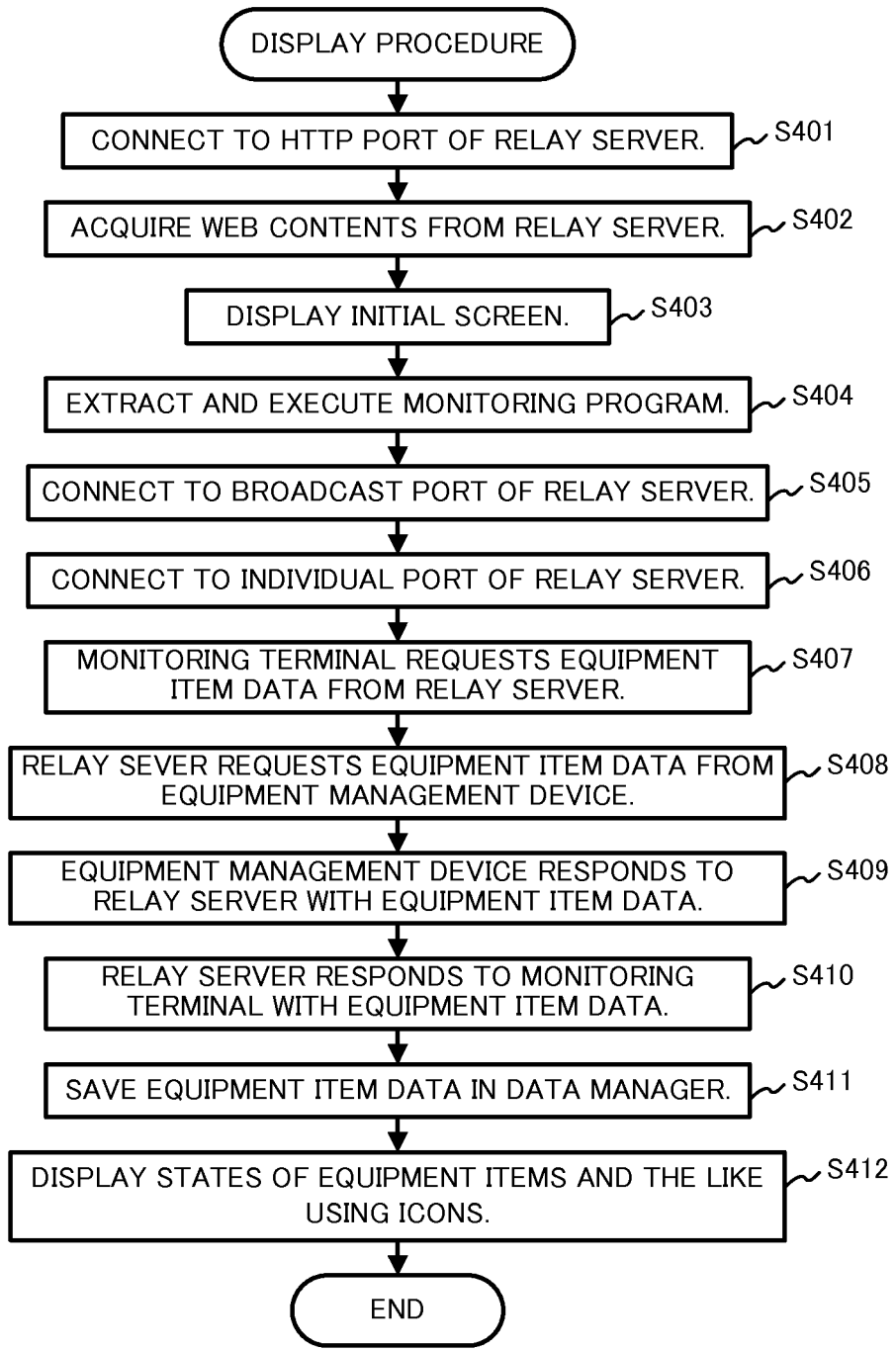
FIG. 7 is a flowchart showing the display procedure.

As shown in FIG. 7, in the display procedure, the controller 310 first connects to the HTTP port 451 of the relay server 400 (Step S401). More specifically, the controller 310 establishes connection between the HTTP port 451 that is put in a connectable state (open) by the controller 410 and the HTTP port 351.

Then, the controller 310 acquires the Web contents 422 from the relay server 400 (Step S402). More specifically, the controller 310 requests the Web contents 422 presented by the URL from the relay server 400. Then, the Web server unit 411 of the relay server 400 responds to the request and the controller 310 acquires the Web contents 422.

Then, the controller 310 displays an initial screen (Step S403). More specifically, the screen configuration file analyzing unit 311 draws on the display 330 an initial screen of the monitoring screen according to the screen configuration file 422a. Here, the initial screen means a monitoring screen containing no information regarding the equipment items 110.

Then, the controller 310 extracts and executes the monitoring program 422b embedded in the Web contents 422 (Step S404). As the monitoring program 422b is executed, the subsequent processing starts.

Then, the broadcast communication control module 312a connects to the broadcast port 452 of the relay server 400 (Step S405). More specifically, the broadcast communication control module 312a establishes connection between the broadcast port 352 and broadcast port 452 by the WebSocket protocol to establish communication with the relay server 400 via the broadcast port 352. As a result, the controller 410 updates the monitoring terminal address 428b stored in the data manager 420.

Then, the individual communication control module 312b connects to the individual port 453 of the relay server 400 (Step S406). More specifically, the individual communication control module 312b establishes connection between the individual port 353 and individual port 453 by the WebSocket protocol to establish communication with the relay server 400 via the individual port 453. As a result, the controller 410 updates the monitoring terminal address 429b stored in the data manager 420.

Then, the monitoring terminal 300 requests the item data 222 from the relay server 400 (Step S407). More specifically, the item data management module 312c gives the individual communication control module 312b an order to acquire the item data 222. Receiving the order, the individual communication control module 312b sends to the relay server 400 a command to request the item data 222 stored in the equipment management device 200.

Then, the relay server 400 requests the item data 222 from the equipment management device 200 (Step S408). More specifically, the individual communication control module 419 receives the command from the monitoring terminal 300 and reads the equipment management device address 429a in the individual port connection information 429 from the data manager 420. Then, the individual communication control module 419 forwards the command to the equipment management device 200 presented by the equipment management device address 429a.

Then, the equipment management device 200 responds to the relay server 400 with the item data 222 (Step S409). More specifically, the individual communication control unit 213 receives the command to request the item data 222 and reads the item data 222 from the data manager 220. Then, the individual communication control unit 213 sends the item data 222 to the relay server 400.

Then, the relay server 400 responds to the monitoring terminal 300 with the item data 222 (Step S410). More specifically, the individual communication control module 419 receives the item data 222 and forwards the item data 222 to the monitoring terminal 300 that have requested the item data 222.

Then, the item data management module 312c acquires and stores in the data manager 320 the item data 222 as the item data 322 (Step S411).

Then, the item data management module 312c displays the states of the equipment items 110 and the like using icons (Step S412). More specifically, the item data management module 312c updates the monitoring screen of the Web browser based on the connection information 322a, state data 322b, and display data 322c. For example, the item data management module 312c displays on the monitoring screen icons superimposed on a floor plan view and presenting the equipment items 110 along with the states of the equipment items 110.

Figure 8:
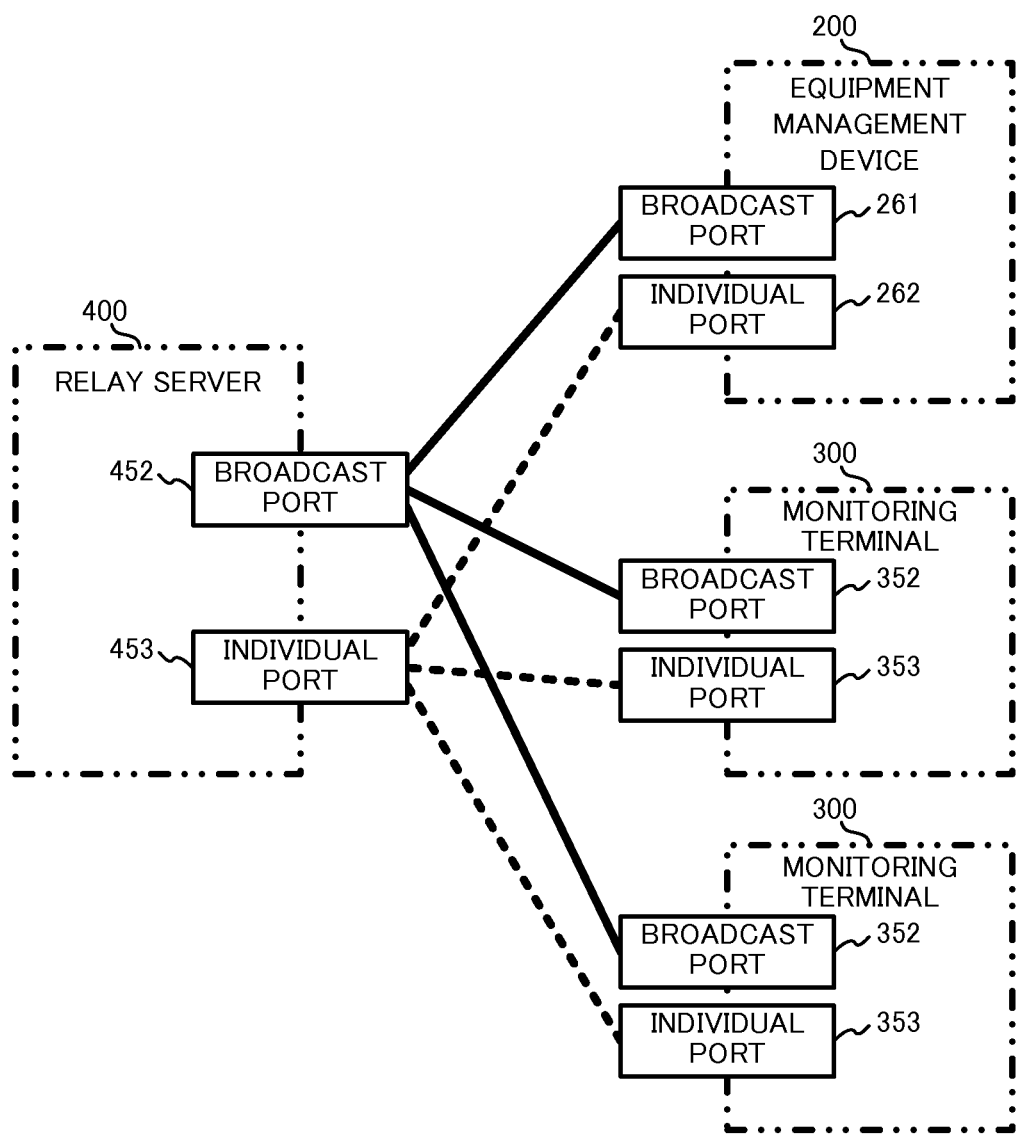
FIG. 8 is an illustration showing the established communication channels.

Then, the controller 310 ends the display procedure. FIG. 8 shows the communication channels established after the display procedure ends. As indicated by the thick solid lines in FIG. 8, the connection of the broadcast port 452 of the relay server 400 to the broadcast port 261 of the equipment management device 200 and to the broadcast ports 352 of monitoring terminals 300 is established. Furthermore, as indicated by the thick broken lines, the connection of the individual port 453 to the individual port 262 and to the individual ports 353 is established. As a result, after the display procedure ends, bidirectional real time communication is available between the equipment management device 200 and monitoring terminals 300 without establishing new connection.

Returning to FIG. 5, following the display procedure (Step S4), the controller 310 determines whether there is any user operation (Step S5). This operation is an operation to monitor information regarding the equipment items 110. If there is no user operation (Step S5: NO), the notification procedures is executed (Step S8).

On the other hand, if there is any user operation (Step S5; YES), the controller 310 sends operation details to the equipment management device 200 via the individual port 353 as a command to request information regarding the equipment items 110 (Step S6).

Then, the controller 310 receives operation results and updates the monitoring screen (Step S7). As a result, the user of the monitoring terminal 300 can immediately view desired information.

Then, the notification procedure is executed (Step S8). The notification procedure is a procedure for the equipment management device 200 to notify the monitoring terminals 300 of the latest states of the equipment items 110. The notification procedure will be described in detail using FIG. 9.

Figure 9:
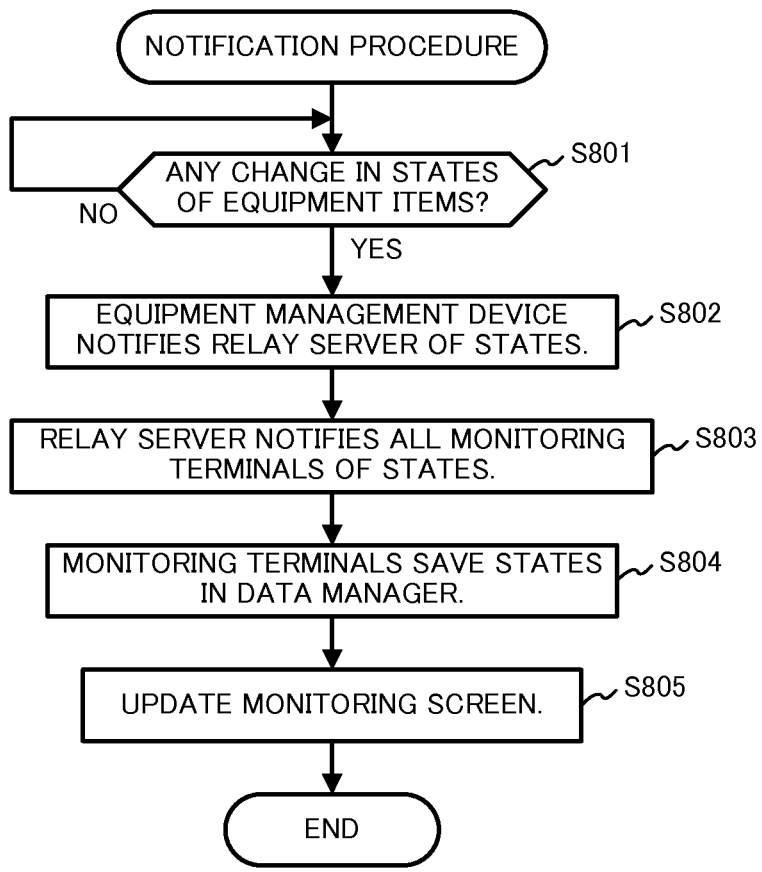
FIG. 9 is a flowchart showing the notification procedure.

As shown in FIG. 9, in the notification procedure, the controller 210 of the equipment management device 200 first determines where there is any change in the states of the equipment items 110 (Step S801). If there is no change in the states (Step S801; NO), the controller 210 repeats the determination of the Step S801.

On the other hand, if there is any change in the states (Step S801; YES), the equipment management device 200 notifies the relay server 400 of the states (Step S802). More specifically, the broadcast communication control unit 212 notifies the relay server 400 of the changed states to notify that there is some change in the states of the equipment items 110.

Then, the relay server 400 notifies all monitoring terminals 300 of the states (Step S803). More specifically, the broadcast communication control module 418 reads the monitoring terminal addresses 428b in the broadcast port connection information 428. Then, the broadcast communication control module 418 notifies all monitoring terminals 300 presented by the monitoring terminal addresses 428b of the states of the equipment items 110. As a result, the states of the equipment items 110 are notified to all monitoring terminals 300 with which the communication via the broadcast port 452 is established.

Then, the monitoring terminals 300 save the states of the equipment items 110 in the data manager 320 (Step S804). More specifically, the item data management module 312c updates the state data 328 based on the states of the equipment items 110 notified from the relay server 400.

Then, the controller 310 updates the monitoring screen (Step S805). More specifically, the item data management module 312c updates the monitoring screen based on the latest state data 328.

Then, the notification procedure ends. Returning to FIG. 5, following the notification procedure (Step S8), the processing of the Step S5 and subsequent steps is repeated.

As described above, the monitoring system 10 according to this embodiment enables communication between the equipment management device 200 and monitoring terminals 300 via the relay server 400. As a result, it is possible to monitor information regarding the equipment items 110 from the monitoring terminals 300 that are not connected to the communication line 51.

Furthermore, communication via the broadcast ports 261, 352, and 452 is established as communication for the equipment management device 200 to notify multiple monitoring terminals 300 of the states of the equipment items 110. This communication corresponds to the arrow A1 in FIG. 1 and the solid lines in FIGS. 8 and 14. Furthermore, communication via the individual ports 262, 353, and 453 is established as communication for monitoring information regarding the equipment management device 200 from each of the monitoring terminals 300. This communication corresponds to the arrows A2 in FIG. 1 and the broken lines in FIGS. 8 and 14. As a result, not all distributable data are distributed from the equipment management device 200 to each of the monitoring terminals 300; data are distributed as necessary. Thus, it is possible to reduce the communication volume and lower the communication cost.

Moreover, in conventional HTTP compliance communication, as a client (monitoring terminal 300) requests data from the server (equipment management device 200), connection between the client and server is established. Then, after the server sends data in response to the client's request, the client and server are disconnected. With such an HTTP framework, it is difficult to send data from the server before a client requests data. Therefore, in some cases, it is difficult to immediately give notice of the states of the equipment items 110 upon some change in the states of the equipment items 110.

However, in this embodiment, the WebSocket protocol compliance communication is established between the equipment management device 200 and monitoring terminals 300. The WebSocket protocol is a technical standard for bidirectional real time communication between a server and a client. Therefore, once the WebSocket protocol compliance connection is established, both the client and the server can send data at any time. As a result, it is possible to immediately notify the monitoring terminals 300 of information regarding the states of the equipment items 110 and various other kinds of information regarding the equipment items 110.

Furthermore, the relay server 400 manages the connected terminal information 423 presenting the equipment management device 200 and monitoring terminals 300 of which the WebSocket protocol compliance communication is established and forwards data based on the connected terminal information 423. As a result, the relay server 400 can easily identify the monitoring terminals 300 monitoring information of the equipment items 110 and notify those monitoring terminals 300 of the information on a real time basis.

Furthermore, since the equipment management device 200 does not need to identify the monitoring terminals 300 that should be the transmission destination of data, the processing executed by the equipment management device 200 can be simplified. Furthermore, the equipment management device 200 notifies only the relay server 400 of information regarding the equipment items 110. As a result, in comparison with the case in which the equipment management device 200 notifies all monitoring terminals 300 of the information, the communication workload of the equipment management device 200 can be reduced. Thus, the equipment management device 200 can be configured with relatively inexpensive parts without using expensive, high load capacity parts.

Furthermore, the equipment management device 200 gives notice of the states only when there is any change in the states of the equipment items 110. As a result, in comparison, for example, with the case in which the states are notified at given time intervals, the communication volume can significantly be reduced. In addition, as the communication volume is reduced, the number of monitoring terminals 300 connectable to the relay server 400 can be increased.

Furthermore, the equipment management device 200 establishes only connection to the relay server 400. As a result, the equipment management device 200 is not revealed on the network NW and therefore not accessed from unspecific terminals Thus, it is possible to lower the possibility of, for example, the equipment management device 200 receiving DOS (denial of service) attacks from vicious users. Thus, real time monitoring via the network NW is possible without affecting the basic function of the equipment management device 200 that is to manage the equipment items 110.

Embodiment 2

Embodiment 2 will be described hereafter mainly in regard to the difference from the above-described Embodiment 1. Here, the same or equivalent components as or to those in the above-described Embodiment 1 are referred to by the equivalent reference numbers and their explanation will be omitted or simplified.

Figure 10:
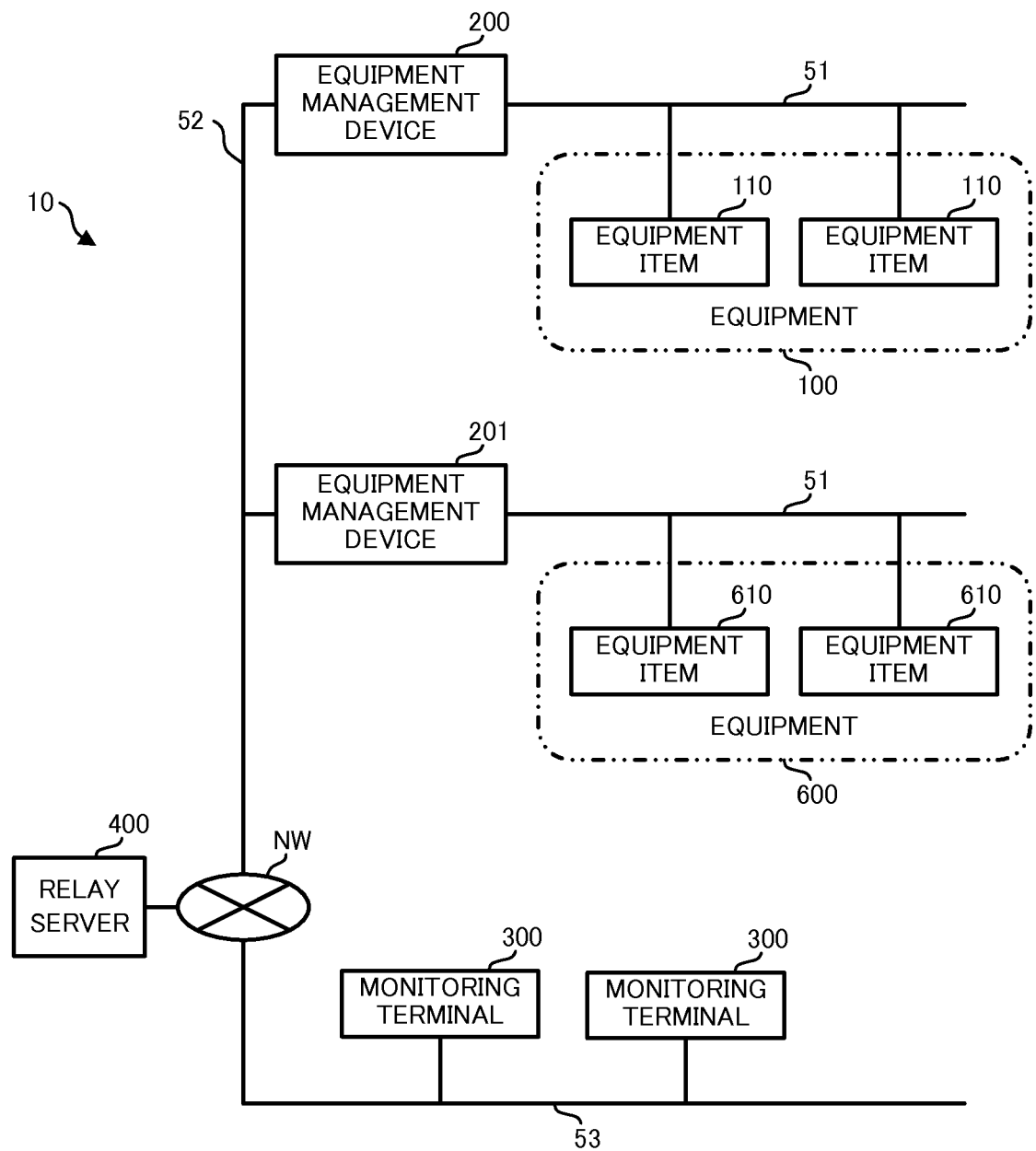
FIG. 10 is a block diagram showing the configuration of the monitoring system according to Embodiment 2.

The monitoring system 10 according to this embodiment is different from the one according to Embodiment 1 in that multiple equipment management devices 200 and 201 are provided as shown in FIG. 10.

The equipment management device 201 has the same configuration as the equipment management device 200. The equipment management device 201 manages multiple equipment items 610 constituting equipment 600. The equipment 600 comprises equipment items 610 installed on a floor different from the equipment items 110.

Figure 11:
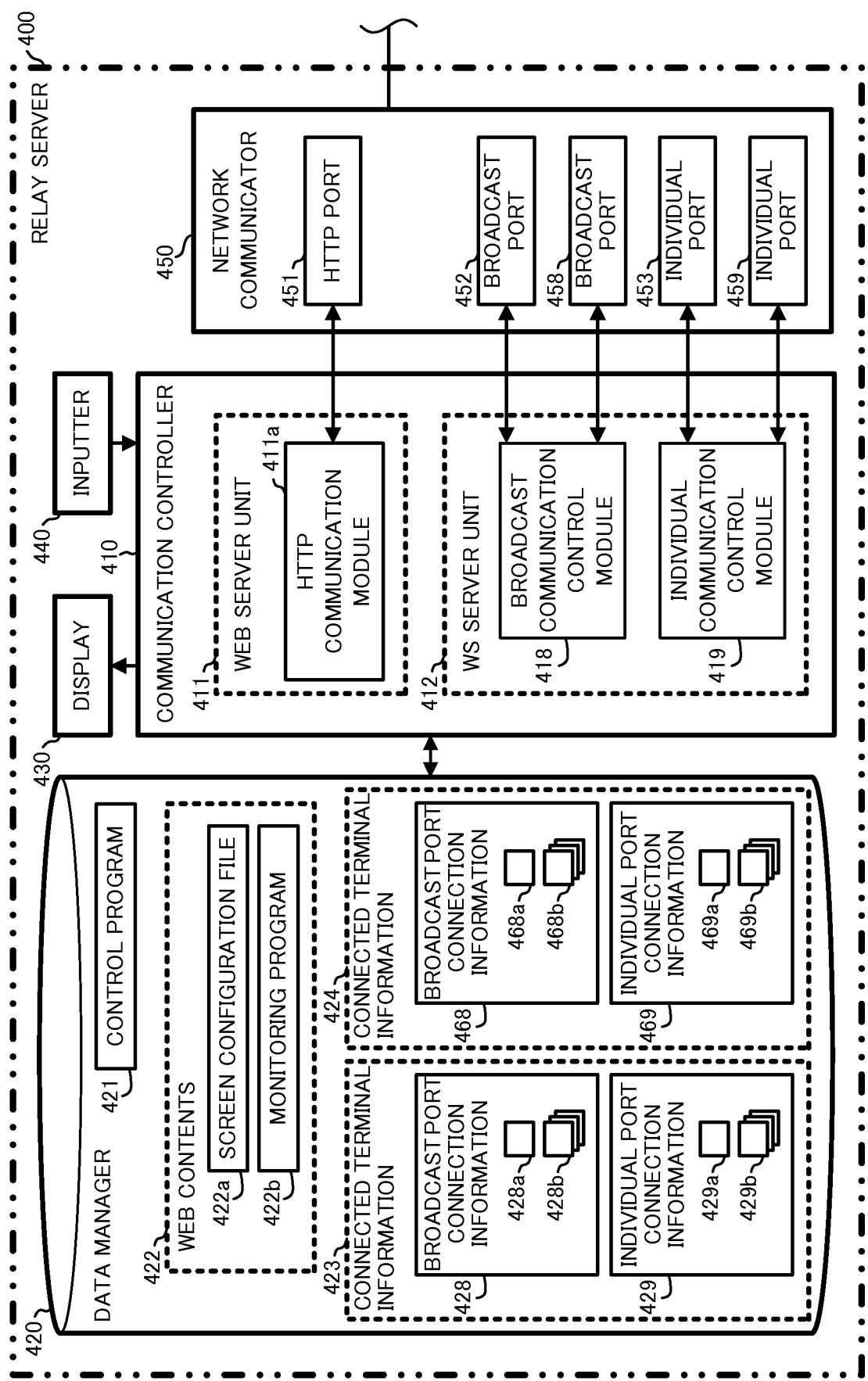
FIG. 11 is a block diagram showing the configuration of the relay server.

The data manager 420 of the relay server 400 stores, as shown in FIG. 11, connected terminal information 424 presenting the terminals of which the connection to the relay server 400 is established. The connected terminal information 424 comprises identification information for identifying the equipment management device 201 and monitoring terminals 300. The connected terminal information 424 includes broadcast port connection information 468 presenting the terminals of which the connection via the broadcast port 458 of the network communicator 450 is established and individual port connection information 469 presenting the terminals of which the connection via the individual port 459 of the network communicator 450 is established.

The broadcast port connection information 468 includes an equipment management device address 468a presenting the IP address of the equipment management device 201 and monitoring terminal addresses 468b presenting the IP addresses of the monitoring terminals 300. On the other hand, the individual port connection information 469 includes an equipment management device address 469a presenting the IP address of the equipment management device 201 and monitoring terminal addresses 469b presenting the IP addresses of the monitoring terminals 300.

Furthermore, the network communicator 450 has a broadcast port 458 and individual port 459 for communication in compliance with the WebSocket protocol. The broadcast port 458 is connected to the broadcast port 261 of the equipment management device 201 and the broadcast ports 352 of the monitoring terminals 300. On the other hand, the individual port 459 is connected to the individual port 262 of the equipment management device 201 and the individual ports 353 of the monitoring terminals 300.

Figure 12:
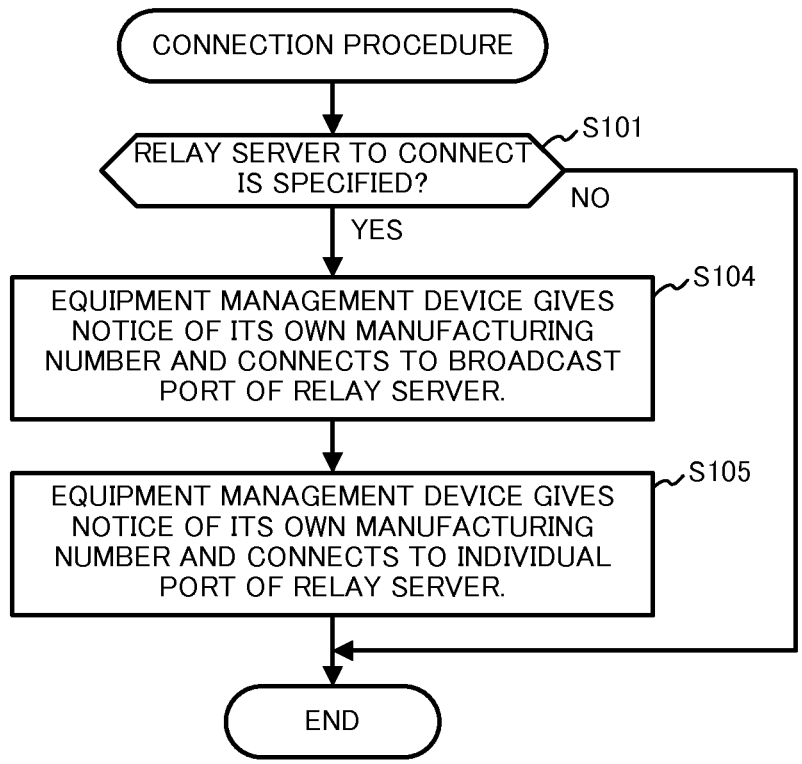
FIG. 12 is a flowchart showing the connection procedure.

The procedure executed by the monitoring system 10 according to this embodiment will be described hereafter. FIG. 12 shows the connection procedure executed by each of the equipment management devices 200 and 201. The connection procedure executed by the equipment management device 200 will be described by way of example.

In the connection procedure according to this embodiment, if the determination is affirmative in the Step S101 (Step S101; YES), the equipment management device 200 gives notice of its own manufacturing number and connects to the broadcast port 452 of the relay server 400 (Step S104). For example, when the manufacturing number of the equipment management device 200 is "123456," the broadcast communication control unit 212 sends a request "GET/websocket/123456/HTTP/1.1" to the relay server 400. Then, of the broadcast ports 452 and 458, the relay server 400 associates, for example, the broadcast port 452 with the manufacturing number of the equipment management device 200 and permits connection to the broadcast port 452. As a result, the broadcast port 452 is assigned to serve as the port for communicating with the equipment management device 200.

Then, the equipment management device 200 gives notice of its own manufacturing number and connects to the individual port 453 of the relay server 400 as in the Step S104 (Step S105). As a result, the individual port 453 is assigned to serve as the port for communicating with the equipment management device 200.

Figure 13:
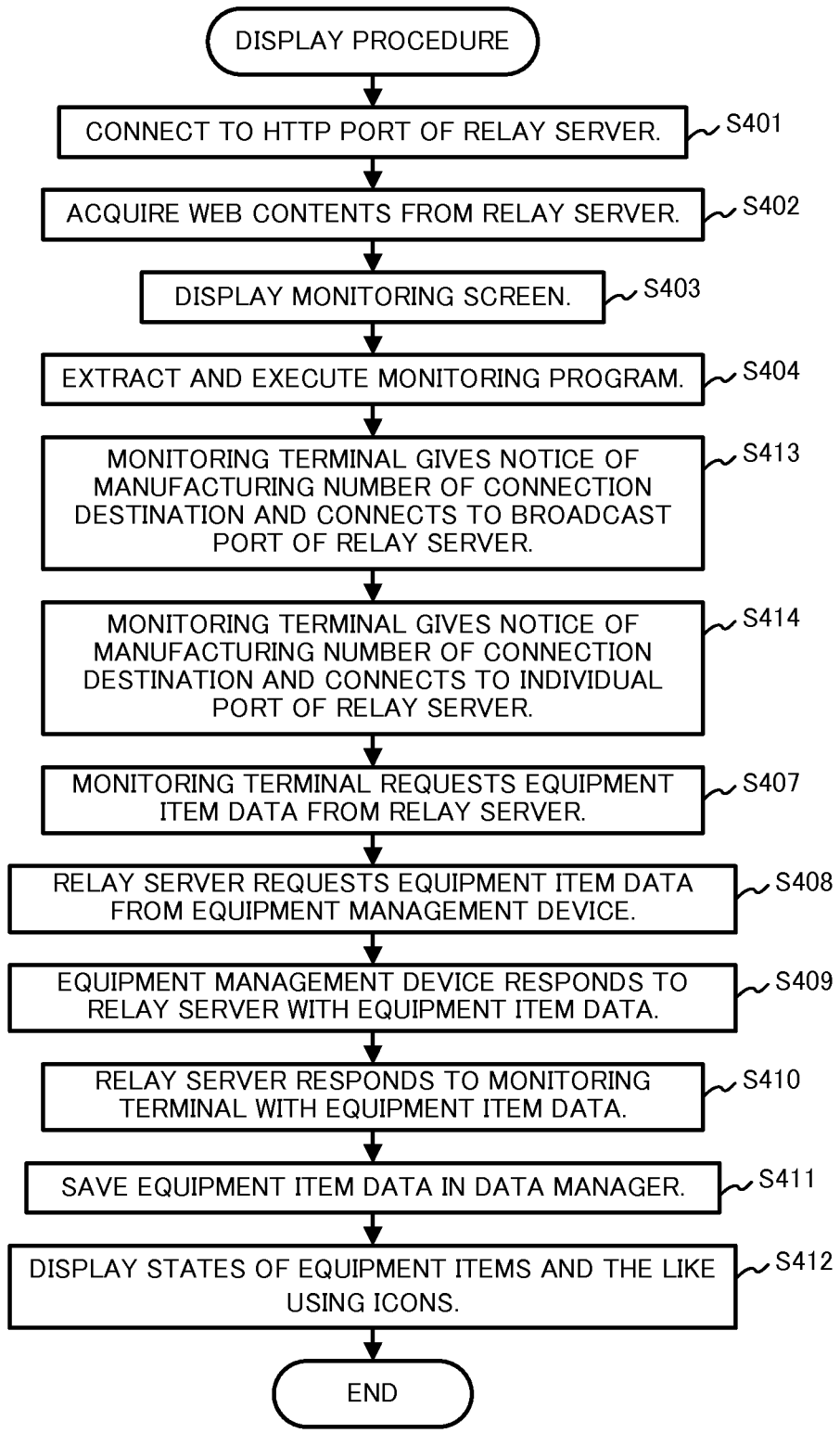
FIG. 13 is a flowchart showing the display procedure.

The display procedure executed in this embodiment will be described hereafter using FIG. 13. As shown in FIG. 13, following the Step S404, the monitoring terminals 300 give notice of the manufacturing number of the equipment management device 200 that is to be connected to the monitoring terminals 300 themselves via the relay server 400 and connects to the broadcast port 452 of the relay server 400 (Step S413). As a result, of the broadcast ports 452 and 458, the relay server 400 permits connection to the broadcast port 452 assigned to the equipment management device 200.

Here, the monitoring terminals 300 can connect to the relay server 400 using a manufacturing number entered by the user. Furthermore, the monitoring terminals 300 can associate and store a user ID (identifier) and the manufacturing number of either one of the equipment management devices 200 and 201 and give notice of the manufacturing number based on the user ID obtained upon login to the monitoring terminals 300 or relay server 400.

Then, the monitoring terminals 300 give notice of the manufacturing number of the equipment management device 200 that is to be connected to the monitoring terminals 300 themselves via the relay server 400 and connects to the individual port 453 of the relay server 400 as in the Step S413 (Step S414). As a result, of the individual ports 453 and 459, the relay server 400 permits connection to the individual port 453 assigned to the equipment management device 200.

Figure 14:
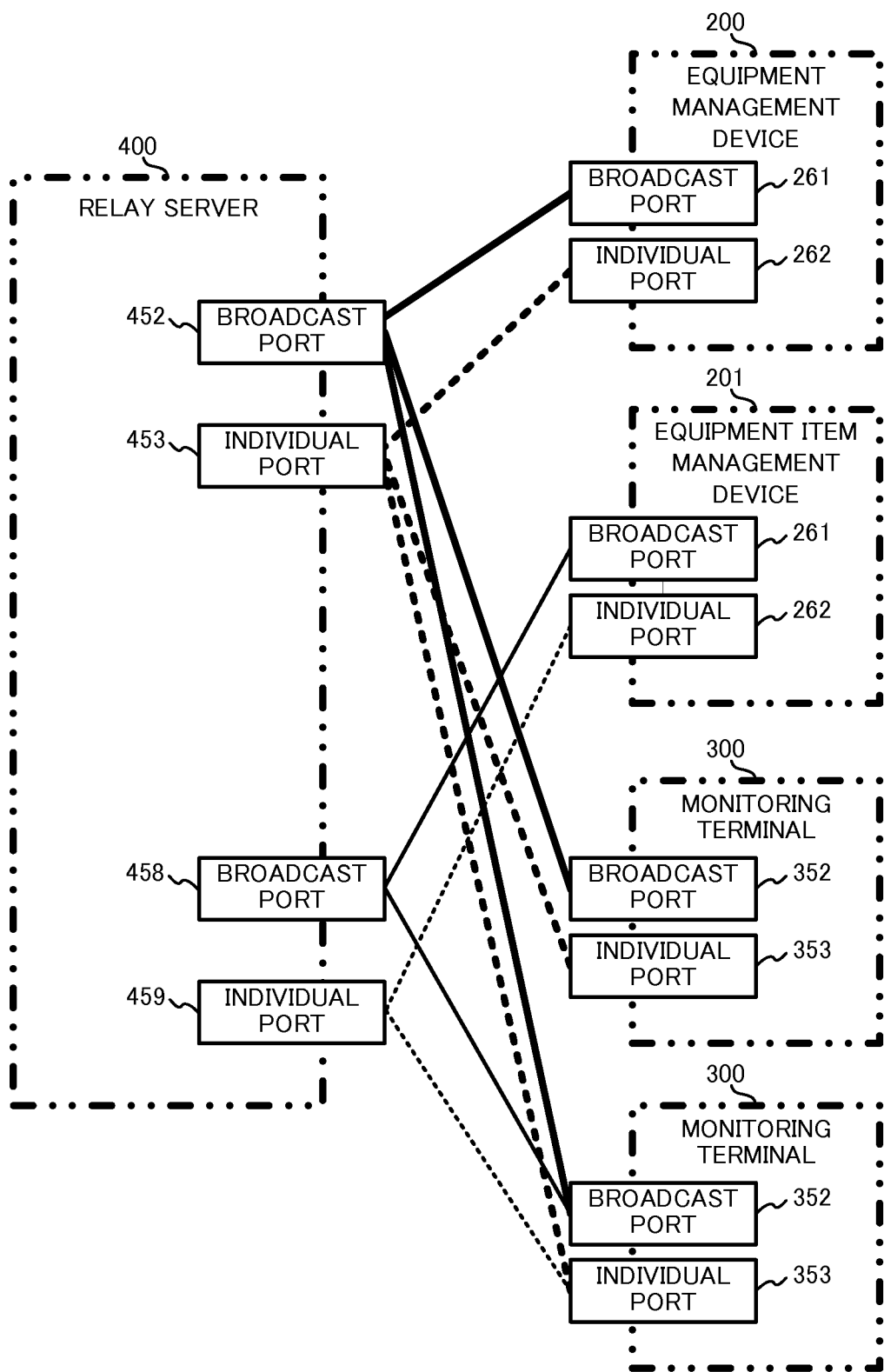
FIG. 14 is an illustration showing the established communication channels.

FIG. 14 shows the communication channels established after the display procedure ends. As indicated by thin solid lines in FIG. 14, the connection of the broadcast port 458 of the relay server 400 to the broadcast port 261 of the equipment management device 201 and to the broadcast port 352 of a monitoring terminal 300 is established. Furthermore, as indicated by thin broken lines, the connection of the individual port 459 to the individual port 262 of the equipment management device 201 and to the individual port 353 of the monitoring terminal 300 is established.

The notification procedure executed in this embodiment will be described hereafter using FIG. 9. In the Step S803 according to this embodiment, the relay server 400 gives notice of the states to all monitoring terminals 300 connected to either one of the broadcast posts 452 and 458 via which the states are notified in the Step S802. More specifically, the relay server 400 notifies the monitoring terminals 300 of the states of the equipment items 110 based on either one of the broadcast port connection information 428 and 468.

As described above, using the monitoring terminals 300 according to this embodiment, the user can monitor information regarding the equipment items 110 managed by the equipment management device 200 and information regarding the equipment items 110 managed by the equipment management device 201 separately.

Embodiments of the present disclosure are described above. The present disclosure is not confined to the above-described embodiments.

For example, the display data 222c can contain building information for identifying the building. When the display data 222c contains building information, it is possible to identify the equipment items 110 installed in each of multiple buildings and monitor information regarding the equipment items 110.

Furthermore, it is possible to use the ratio to the floor size (for example, the ratios in the X-axis and Y-axis directions) in place of the X and Y coordinates presenting the locations of the equipment items contained in the display data 222c. Furthermore, the controller 310 can change the positions of the icons presenting the equipment items as the plan view displayed based on the display data 322c is enlarged or reduced in size. As a result, the icons can be displayed at proper positions.

Furthermore, the communication lines 51 to 53 can be dedicated communication lines, general-purpose wired or wireless LAN, infrared communication, NFC (near field communication), Zygbee, or RS-485 communication lines.

Furthermore, the equipment management device 200 according to the above-described embodiments notifies multiple monitoring terminals 300 of the states of the equipment items 110 when there is any change in the states of the equipment items 110. This is not restrictive. For example, when there is any change in some parameter values containing the set values for the equipment items 110 to operate on the operation schedule and in an energy-saving mode, the parameter values can be notified. Furthermore, when there is any change in time-series data such as history of abnormal events having occurred to the equipment items 110, the time-series data can be notified. Furthermore, the states and the like can be notified not only when there is any change but also at regular intervals.

The monitoring terminals 300 acquire the Web contents 422 from the relay server 400 and display a monitoring screen using a Web browser. This is not restrictive. For example, the monitoring terminals 300 can display a monitoring screen by executing the control program 321 without using a Web browser.

Furthermore, the equipment management device 200 can be configured without the display 230 and inputter 240. When the display 230 and inputter 240 are eliminated, some terminals and the like connected to the communication line 51 or communication line 52 can be used as the user interface of the equipment management device 200.

Furthermore, the data transferred between the monitoring terminals 300 and the relay server 400 and the data transferred between the equipment management device 200 and relay server 400 can be in the XML (extensible markup language) format or the like. Furthermore, these data can be binary data to reduce the communication volume. Furthermore, the data can be encrypted to keep the communication contents in secret.

Furthermore, in place of the WebSocket protocol according to the above-described embodiments, the Comet, an applied HTTP, can be used to realize pseudo real time communication. Furthermore, a proprietary protocol can be used.

Furthermore, the equipment management devices 200 and 201 according to the above-described Embodiment 2 give notice of the manufacturing number in the Steps S104 and S105. The equipment management devices 200 and 201 can give notice of another kind of information for identifying the equipment management devices 200 and 201. Furthermore, the monitoring terminals 300 according to the above-described Embodiment 2 give notice of the manufacturing number in the Steps S413 and S414. The monitoring terminals 300 can give notice of another kind of information for identifying the equipment management devices 200 and 201.

Furthermore, in the above-described Embodiment 2, a GET request is used to give notice of the manufacturing number as an example of giving notice of the manufacturing number. This is not restrictive. For example, the manufacturing number can be notified by adding the manufacturing number to the HTTP header region or data region, or the data region of the WebSocket protocol compliance communication.

In the above-described embodiments, an office building is referred to by way of example. However, the monitoring system 10 can be configured for the equipment items installed in various buildings including houses (residences) and plants.

The functions of the equipment management device 200, monitoring terminals 300, and relay server 400 according to the above-described embodiments can be realized by dedicated hardware or a conventional computer system.

For example, the control programs 221, 321, and 421 stored in the data managers 220, 320, and 420 can be saved and distributed on a computer-readable non-transitory recording medium such as a flexible disk, CD-ROM (compact disk read-only memory), DVD (digital versatile disk), and MO (magneto-optical disk) and installed on a computer to configure a device executing the above-described processing.

Furthermore, the control programs 221, 321, and 421 can be saved in a disk device of a given server unit on a communication network such as the Internet and, for example, superimposed on carrier waves and downloaded on a computer.

Furthermore, it is possible to activate and execute the control programs 221, 321, and 421 while transferring the same via a network such as the Internet so as to achieve the above-described processing.

It is further possible that with the control programs 221, 321, and 421 being executed in whole or in part on a server unit, a computer executes the control programs 221, 321, and 421 while transmitting/receiving information regarding the processing via a communication network so as to achieve the above-described processing.

When the above-described functions are realized in part by an OS (operating system) or realized by cooperation of an OS and application programs, only the non-OS part can be stored and distributed on a medium or downloaded on a computer.

Furthermore, the means for realizing the functions of the equipment management device 200, monitoring terminals 300, and relay server 400 are not restricted to software and some or all of the functions can be realized by dedicated hardware (circuits or the like).

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The monitoring system, equipment management device, monitoring method, and program of the present disclosure are suitable for monitoring via a network the states of equipment items installed in a building or the like.

REFERENCE SIGNS LIST

10 Monitoring system
51 to 53 Communication line
100, 600 Equipment
110, 610 Equipment item
200, 201 Equipment management device
210, 310, 410 Controller
211 Item control unit
212 Broadcast communication control unit
213 Individual communication control unit
220, 320, 420 Data manager
221, 321, 421 Control program
222, 322 Item data
222a, 322a Connection information
222b, 322b, 328 State data
222c, 322c Display data
230, 330, 430 Display
240, 340, 440 Inputter
250 Item communication manager
260, 350, 450 Network communicator
261, 352, 452, 458 Broadcast port
262, 353, 453, 459 Individual port
300 Monitoring terminal
311 Screen configuration file analyzing unit
312 Monitoring program execution unit
312a Broadcast communication control module
312b Individual communication control module
312c Item data management module
328 State data
351, 451 HTTP port
400 Relay server
411 Web server unit
411a HTTP communication module
412 WebSocket server unit
412 WS server unit
418 Broadcast communication control module
419 Individual communication control module
422 Web contents
422a Screen configuration file
422b Monitoring program
423, 424 Connected terminal information
428, 468 Broadcast port connection information
428a, 429a, 468a, 469a Equipment management device address
428b, 429b, 468b, 469b Monitoring terminal address
429, 469 Individual port connection information
NW Network

The invention claimed is:
1. A monitoring system comprising:
a plurality of equipment management devices configured to manage equipment items installed in a building;
a server; and
terminals, wherein the server comprises first ports and second ports different from the first ports, each equipment management device of the plurality of equipment management devices being uniquely assigned to a first port and a second port of the first ports and the second ports of the server;

the equipment management device comprises:
  a notifier configured to establish communication with the server by connecting one port of the equipment management device and the first port assigned to the equipment management device, and to notify the server of states of the equipment items through the first port; and
  a transmitter configured to establish communication with the server by connecting another port of the equipment management device and the second port assigned to the equipment management device, and to receive a request for the equipment information relating to the equipment items from the second port of the server, and to transmit the equipment information to the server through the second port in response to the received request; and the terminals each comprise:
  an acquirer configured to establish communication with the server by connecting one port of a respective terminal and the first port of the server assigned to the equipment management device to notify the terminal of the states of the equipment items, and to acquire the states of the equipment items from the server through the first port of the server;
  a receiver configured to establish communication with the server by connecting another port of the respective terminal and the second port of the server assigned to the equipment management device to send the equipment information to the terminal, and to transmit a request for the equipment information to the second port of the server and to receive the equipment information from the server through the second port of the server; and
  a presenter configured to present to a user the states of the equipment items acquired by the acquirer and the equipment information received by the receiver, the server (i) notifies the terminals of the states through the first port upon being notified of the states of the equipment items by the equipment management device and (ii) transmits requests from the terminals to the equipment management device through the second port and transmits a response of the plurality of equipment management devices to the requests of the terminals to the terminals from which the requests originated through the second port.

2. The monitoring system according to claim 1, wherein the server further comprises:
  a storage configured to store first connection information presenting the equipment management device and the terminal of which the communication with the server is established through the first port and second connection information presenting the equipment management device and the terminal of which the communication with the server is established through the second port;
  a first relay device configured to relay, based on the first connection information, the communication through the first port between the equipment management device and the terminal; and
  a second relay device configured to relay, based on the second connection information, the communication through the second port between the equipment management device and the terminal.

3. The monitoring system according to claim 1, wherein the server comprises:
  a storage configured to store, for each of the equipment management devices, first connection information presenting the equipment management device and the terminal of which communication with the server is established through the first port and second connection information presenting the equipment management device and the terminal of which communication with the server is established through the second port;
  a first relay device configured to, based on the first connection information for each of the equipment management devices, relay communication through the first port between the equipment management device and the terminal; and
  a second relay device configured to, based on the second connection information for each of the equipment management devices, relay communication through the second port between the equipment management device and the terminal.

4. The monitoring system according to claim 1, wherein the server comprises a distribution device configured to distribute Web contents,
  the acquirer is configured to establish communication with the server based on the Web contents distributed by the distribution device, and
  the receiver is configured to establish communication with the server based on the Web contents distributed by the distribution device.

5. The monitoring system according to claim 4, wherein the server comprises a third port that is different from the first port and is different from the second port,
  the distribution device is configured to distribute Web contents through the third port, and
  a communication protocol of the communication through the first port and a communication protocol of the communication through the second port are both different from a communication protocol of communication through the third port.

6. The monitoring system according to claim 1, wherein the notifier is configured to give notice of the states of the equipment items when there is any change in the states of the equipment items.

7. The monitoring system according to claim 1, wherein the notifier and the acquirer are configured to establish communication with the server in compliance with a WebSocket protocol, and
  the transmitter and the receiver are configured to establish communication with the server in compliance with the WebSocket protocol.

8. A monitoring method that is executed by a monitoring system comprising a plurality of equipment management devices configured to manage equipment items installed in a building, a server, and terminals, the monitoring method comprising:
  establishing, by each equipment management device of the plurality of equipment management devices, communication with the server by connecting one port of the equipment management device and a first port of the server that is assigned to a unique equipment management device of the plurality of equipment management devices, and notifying the server of states of the equipment items through the first port;
  establishing, by the equipment management device, communication with the server by connecting another port of the equipment management device and a second port of the server that is different from the first port and that is assigned to another unique equipment management device of the plurality of equipment management devices, receiving a request for equipment information regarding the equipment items from the second port of the server, and transmitting the equipment information to the second port of the server in response to the received request;

establishing, by the terminal, communication with the server by connecting one port of the terminal and the first port assigned to an equipment management device of the plurality of equipment management devices that notifies the terminal about states of the equipment items, and acquiring from the first port of the server the states of the equipment items;

establishing, by the terminal, communication with the server by connecting another port of the terminal and the second port assigned to an equipment management device of the plurality of equipment management devices that sends the equipment information to the terminal, transmitting a request for the equipment information to the second port of the server, and receiving the equipment information from the second port of the server; and presenting, by the terminal, to a user the acquired states of the equipment items and the received equipment information;

notifying, by the server, to the terminals of the states upon being notified by the equipment management device about the states of the equipment items through the first port of the server; and transmitting, by the server, to the equipment management device the requests by the terminals through the second port of the server and transmitting to the terminals from which the requests originated through the second port of the server, a response of the equipment management device to the requests of the terminals.

* * * * *